United States Patent [19]

Hahmann et al.

[11] Patent Number: 4,986,074
[45] Date of Patent: Jan. 22, 1991

[54] HYDRAULIC CYLINDER CONTROL SYSTEM FOR GARBAGE COLLECTION TRUCK LIFT-DUMP HANDLER

[75] Inventors: Wolfgang Hahmann, Kempen; Johannes Kirchhoff, Iserlohn; Georg Sandkuhler, Hemer, all of Fed. Rep. of Germany

[73] Assignees: Barmag AG, Remscheid; Edelhoff Polytechnik GmbH & Co., Iserlohn, both of Fed. Rep. of Germany

[21] Appl. No.: 287,029

[22] Filed: Dec. 21, 1988

[30] Foreign Application Priority Data

Dec. 22, 1987 [DE] Fed. Rep. of Germany ....... 3743564
Jan. 15, 1988 [DE] Fed. Rep. of Germany ....... 3800990

[51] Int. Cl.$^5$ .............................. B25J 9/14; B25J 9/20
[52] U.S. Cl. ........................ 60/468; 91/176; 91/363 R; 91/518; 91/520; 91/531; 91/436; 414/408
[58] Field of Search ............... 91/176, 216 R, 363 R, 91/520, 526, 530, 531, 518, 436; 414/408; 60/468

[56] References Cited

U.S. PATENT DOCUMENTS

| | | | |
|---|---|---|---|
| 3,795,177 | 3/1974 | Cryder et al. ............... | 91/520 X |
| 4,121,504 | 10/1978 | Nowak .......................... | 91/363 R X |
| 4,125,974 | 11/1978 | Kay et al. .................... | 91/530 X |
| 4,244,405 | 1/1981 | Zirker et al. ................ | 91/520 X |
| 4,369,576 | 1/1983 | McVaugh ...................... | 91/216 R X |
| 4,622,886 | 11/1986 | Imada et al. ................ | 91/530 X |
| 4,709,618 | 12/1987 | Zongker ....................... | 91/520 X |
| 4,715,767 | 12/1987 | Edelhoff et al. ............. | 414/408 |

FOREIGN PATENT DOCUMENTS 138503 10/1981 Japan ..................... 91/530

Primary Examiner—Edward K. Look
Assistant Examiner—George Kapsalas
Attorney, Agent, or Firm—Bell, Seltzer, Park & Gibson

[57] ABSTRACT

An article handling apparatus is disclosed which comprises two independently controllable fluid actuated drives. The first fluid actuated drive comprises a cylinder and a differential piston which defines a large chamber and a smaller chamber. Also, a control system is provided which maintains a differential pressure between the large and small chambers in each of several operating positions. The second fluid actuated drive is mounted to the movable member of the first drive, and the second drive is controlled by fluid lines leading respectively to the large and small chambers of the first drive.

21 Claims, 2 Drawing Sheets 4,986,074

HYDRAULIC CYLINDER CONTROL SYSTEM FOR GARBAGE COLLECTION TRUCK LIFT-DUMP HANDLER

BACKGROUND OF THE INVENTION

The present invention relates to an article handling apparatus with two fluid actuated drives, and which are controllable independently of each other.

Article handling apparatus are commonly utilized in the fields of engineering and manufacturing, and particularly in connection with robots, by which objects are able to be moved and positioned in one plane. To be able to move an article along any desired path and to guide the article at any desired position, the two drives need to be controllable independently of each other, i.e. by first and second separate control systems. It is obvious that substantial fluid control equipment is necessary for this independent control, since the required fluid lines must be positioned between the source of pressure and the drives and the pertinent control systems.

It is an object of the present invention to provide an article handling apparatus of the described type, and which requires minimal fluid equipment, and at the same time is sturdy.

SUMMARY OF THE INVENTION

These and other objects and advantages of the present invention are achieved in the embodiments illustrated herein by the provision of an article handling apparatus which comprises a first fluid actuated drive comprising a housing and a differential piston mounted in the housing, with the housing and piston being movable relative to each other, and wherein the piston divides the housing into a small chamber and a large chamber. A first fluid control means is provided for selectively conveying fluid to and from each of said chambers so as to selectively move one of the housing and piston in either direction with respect to the other of the housing and piston. A second fluid actuated drive is provided which has two fluid receiving chambers for operating the second drive in opposite directions, and a second fluid control means is provided for selectively connecting the small chamber of the first drive with either one of said chambers of the second drive, and while connecting the large chamber of the first drive with the other of said chambers of the second drive.

The apparatus of the present invention typically utilizes hydraulic fluid. Also, the second drive and the second control means are preferably mounted on the movable member of the first drive, and thus no additional, movable, hydraulic fluid lines are required, and the movements of the two drives are superimposed.

The first drive in the meaning of the present invention is preferably a drive with a finite motion in the form of a straight line or curved linear movement, Such a linear drive may take the form of a cylinder-piston assembly. The second drive may be a rotating drive motor or likewise a linear drive, i.e., a cylinder-piston assembly. In the case of cylinder-piston assemblies within the scope of the present invention, the piston may be movable with the piston rod relative to the cylinder, or the cylinder may be movable relative to the piston and the piston rod. In the present application, the movable part is described as an output member.

If the second drive is mounted to the output member of the first drive, the first drive may be connected, via tubing, with the first hydraulic system, which may be stationary. In one particularly sturdy embodiment of the invention, which is resistant to breakdown, all of the hydraulic lines between the first drive and the second hydraulic system and the second drive are positioned on the output member of the first drive, so that no further hydraulic lines are needed. The first and/or second hydraulic systems are preferably electrically actuated by electromagnets. As a result, in this embodiment electrical lines need to be positioned only for the control of the second control system.

According to the invention, the small chamber of the first drive receives a constant pressure in all operating positions of the continuously controllable first control system. In one specific embodiment, the small chamber of the first drive is connected with the pump and in addition, with a relief valve, which serves to maintain the pump pressure constant. Preferably, a precontrolled relief valve is used, the precontrol stage of which connects the pump line with the tank, and which is biased on its control side by a spring, together with the pump pressure via a throttle. This permits the pump pressure to be sensitively regulated to a constant value.

In a hydraulically simple embodiment, and in which the delivery of large hydraulic flows is avoided, an off-position is provided for the first control system, in which the biasing of the spring side of the precontrol stage of the relief valve by the pump pressure is discontinued, so that only the spring pressure side continues to be connected. As a result, the relief valve operates as an excess pressure valve, the spring being so designed that the pump must deliver only against a small pressure (for example, 12 bar). Thus the pump pressure overcomes the force of the spring and the pump then delivers directly to the tank.

As previously described, the first control system connects the small chamber of the first drive with the pump in all positions. In addition, a connection of the precontrol stage exists in all operating positions of the first control system for the purpose of signaling back the pump pressure. The traveling motion of the first drive is controlled in a steady transition in that the first control system connects the large chamber with the tank, or closes the cylinder chamber, or connects the large cylinder chamber with the pump.

In accordance with the present invention, the passage through the second drive is adjustable load-independently and independent of the pressure difference of the first drive, so that also the speed of the first drive is proportional to the input signal of the second control system. Preferably, the second control system is electrically controllable, so that only an electrical connection is needed between the stationary control stand and the output member of the first drive.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENTS

Figure 1:
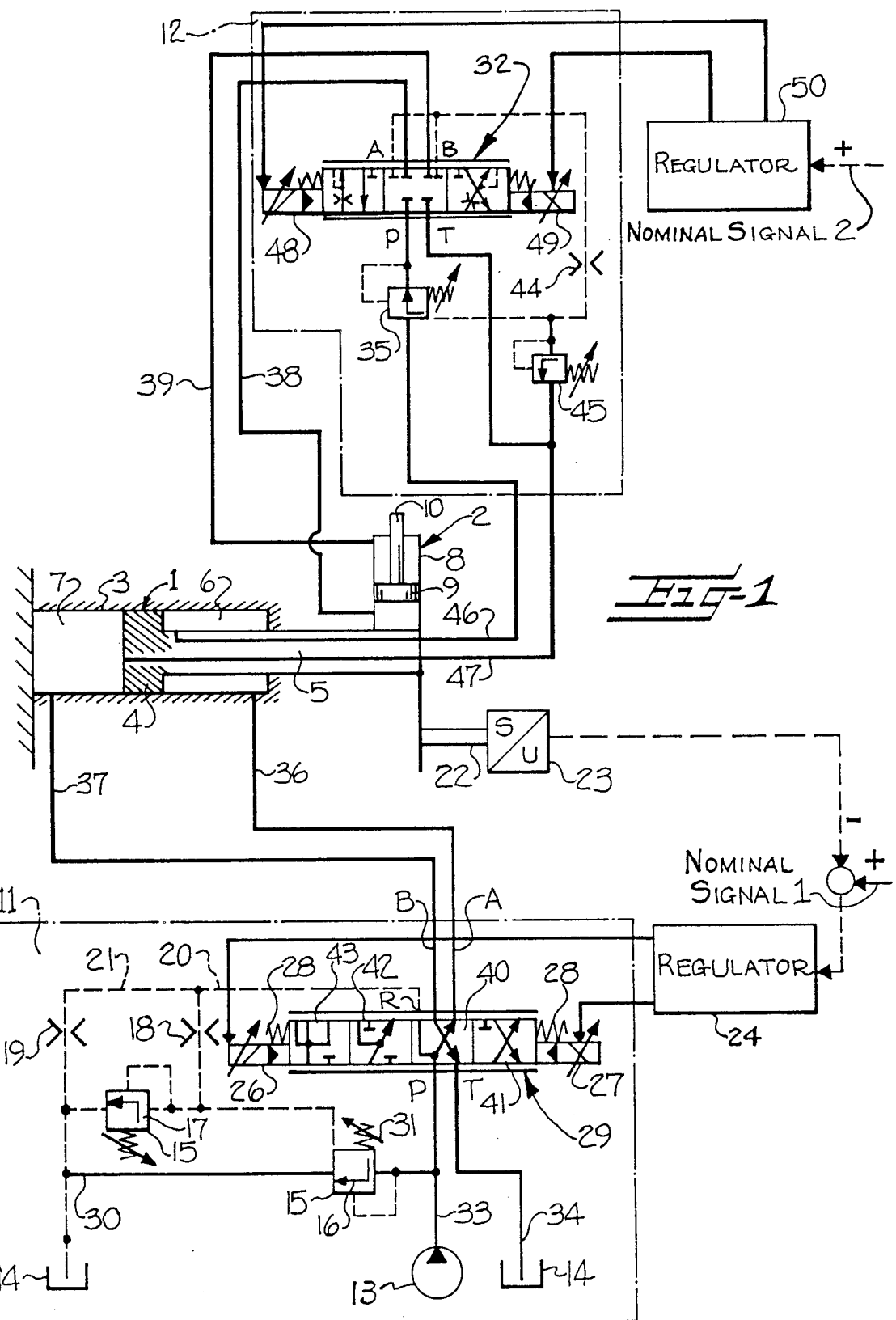
FIG. 1 is a schematic diagram of one embodiment of the present invention.

The circuit diagram of FIG. 1 illustrates a first drive 1 which has a first control system 11 associated therewith, and a second drive 2 which has a second control system 12 associated therewith The first drive 1 is a cylinder-piston assembly, comprising a cylinder 3 and a differential piston 4 with a piston rod 5 movable therein. The piston 4 forms with the piston rod 5 a small chamber 6 in the cylinder, and the large piston surface facing away from the piston 5 forms a large chamber 7 in the cylinder. In this embodiment, the first drive 1 represents a linear drive, and the piston rod 5 is the output member or movable member of the first drive.

The second drive 2 is mounted on the piston rod 5. As illustrated, the second drive is likewise a linear drive in the form of cylinder-piston assembly. However, it may also be a hydraulic motor or any other hydraulic drive. The illustrated second drive 2 comprises a cylinder 8, which accommodates a piston 9 with a piston rod 10. Located on the piston rod 10 are grippers (not shown) for grasping a workpiece or a container, which is to be transported from one position to another along any desired, predetermined path. Also, it will be seen that the piston rod 10 represents the output member of the second drive.

The position of the piston rod 5 is constantly scanned by a sensor 22 and a distance measuring device 23. The displacement pickup 23 may, for example, be a potentiometer, the output voltage U of which is adjusted as a function of the distance S determined by the sensor 22. The output signal of the displacement pickup 23 is compared with a nominal value, which is input, for example, by an operator. The differential value is entered into a regulator 24. As a function of the sign of the differential signal, the regulator controls a left-hand adjusting magnet 26 or a right-hand adjusting magnet 27 of a first control system 11.

The first control system 11 comprises a multi-way valve 29, which is actuatable between four switching positions and held by a spring 28 in one of these positions when the adjusting magnets 26, 27 are not magnetized. The individual switching positions of the valve 29 will be explained below. On the one hand, the valve 29 is connected, via a pump connection 33, with the pump 13, and on the other hand, via tank connection 34 with the tank 14. Further connections A, B are connected, via a line 36, with the small chamber 6, and via a line 37 with the large chamber 7 of the first drive. Further, the valve 29 possesses a connection R for a pump pressure signaling line 20, the function of which will be described in more detail below. The first control system 11 also comprises a precontrolled relief valve with a main control stage 16, a pressure adjusting valve 17 and a throttle 18, which is interposed in the pump pressure signaling line 20. The piston of the main control stage 16 controls a bypass line 30 between the pump 13 and the tank 14 as a function of a spring 31 and the pressure which is applied to the spring side of the main control piston via the pump pressure signaling line 20 in the operating positions of the multi-way valve 29. Also, the pump pressure signaling line 20 is dischargeable toward the tank 14 via the pressure adjusting valve 17, which is likewise relieved by the spring pressure. A suitable, precontrolled relief valve with the main control stage 6, pressure adjusting valve 17 and throttle 18 is known, for example, from the book Backé "Grundalgen der Oelhydraulik"[Fundamentals of Oil Hydraulics], 4th Ed., 1979, page 243. Otherwise, the pump pressure signaling line 20 is constantly connected with the tank, via relief line 21 and a narrow throttle 19, which is smaller than throttle 18.

The multi-way valve 29 possesses four switching positions, among which the valve can be continuously actuated. In all switching positions, the pump connection P is connected with the small chamber 6 via connection A and line 36. In the neutral or first operative position 40, the magnets 26, 27 are not biased, and the large cylinder chamber 7 is additionally connected with the tank via the connections B-T. Further, in the position 40 the pump pressure biases both the control side of the main control stage 16 of relief valve 15, via connection R and pump pressure signaling line 20, and the throttle 18.

When the magnet 27 is energized, the valve 29 switches to its off position 41. In the off position 41 the pump pressure signaling line 20 is disconnected. Consequently, the control side of the main control stage 16 is relieved from pressure toward the tank via throttles 18 and 19, so that only spring 31 biases the piston of the main control stage with little force. As a result, the main control stage 16 operates in this position like a so-called bypass valve, in that the pump pressure overcomes the small pressure effected by the spring 31, and the pump 13 is connected with the tank 14 via the bypass line 30, and thus an almost wasteless circulation of the hydraulic fluid is achieved.

As a function of the energization of the adjusting magnet 26, the multi-way valve 29 can be switched from its first operative position 40 to its other operating positions 42 and 43. In the position 42, referred to herein as the stationary position, the connection of the large cylinder chamber 7 with the tank 14, which exists in the first operative position 40, is interrupted. In the position 43, referred to herein as the second operative position, the large cylinder chamber 7 is connected with the pump connection 33.

The central part of a second control system 12 is a proportional action valve 32. This valve is connected with the small chamber 6 via a connection P and a line 46, and with the large chamber 7 via its connection T and a return flow line 47. In addition, the proportional action valve 32 is connected, via its connection A and a line 38 with the large chamber of cylinder 8 of the second drive 2, and via its connection B and line 39 with the small chamber of cylinder 8. Interposed in the line 46 is a two-way pressure balance 35, such as is described in Backé, cited above, page 242. The proportional action valve 32 has also connections to a load pressure signaling channel, through which the spring side of the pressure balance 35 can be biased by the load pressure of the connections A or B of the proportional action valve. Finally, a relief valve 45 is provided, which allows to relieve one of the load pressure lines 38 or 39 to the large chamber 7, via the return flow line 47, depending on the switched position of the proportional action valve 32.

The proportional action valve 32 is controlled by electromagnets 48, 49 as well as a regulator 50. A nominal value for the second drive may be entered into the regulator 50, for example, by hand. As a function of the nominal value, the proportional action valve 32 switches from its intermediate idle position to one of its operating positions. In the operating positions, the piston 9 of the second drive is biased by the pressure of the small chamber 6 on its respective working pressure side, and by the pressure of the large chamber 7 on its discharge side. As a function of the pressure difference between the large chamber 6 and the small chamber 7, the piston performs with its rod 10 a movement in the one or the other direction.

To now describe the operating method, it will be understood that the pump 13 of the entire system is in continuous operation. Assuming that the nominal value input for regulator 24 is such that the magnet 27 is energized, the multi-way valve 29 moves to its off position 41. The small chamber 6 of the first drive is connected with the pump, and the large cylinder chamber 7 is connected with the tank. The precontrol stage 16 is not biased by the pump pressure via line 20, but is relieved from pressure toward the tank 14 via throttle 18, relief line 21 as well as throttle 19. Consequently, only spring 31 is operative with a relatively small force on the piston of the precontrol stage 16 in the direction of closing. Under a pressure of, for example, 12 bar, the pilot valve opens, so that, under this pressure, the flow from the pump is diverted to the tank via relief line 30. Since no pressure exists in the cylinder chamber 7, the low pressure in the cylinder chamber 6 will suffice to move the piston 4 to the left as seen in FIG. 1, and against a stop. The pressure in the cylinder chamber 6 may be applied to the drive 2, but will only be adequate for a no-load operation. Preferably, the regulator 50 is so programmed that in the off position of multi-way valve 29 one of the switching position of the proportional action valve 32 is actuated, and which causes drive 2 to move to its idle position.

In the operation of the handling apparatus, the positions 40, 42, 43 of the multi-way valve 29 are continuously actuated. The position 42 is actuated when the output signal of the displacement pickup 23 is equal to the nominal value signal and, thus, the differential signal 25 is equal to zero. If the nominal value is changed, the magnet 26 will be energized to a greater or lesser extent, and the operative positions 43 or respectively 40 will be actuated. As a result, the pump pressure continues to bias the small cylinder chamber 6. Furthermore, the pump pressure continues to bias the control side of the precontrol stage 16 via the pressure signaling line 20. However, the pressure in the large chamber 7 is adjusted between the tank pressure and the full pump pressure, and the chamber 7 is closed in the stationary position 42. Since the piston 4 is designed as a differential piston, an equilibrium of forces on the piston 4 requires a higher pressure in the small chamber 6 than in the large chamber 7. Since furthermore the position of the piston 4 is signaled back to the regulator 24 via the sensor 22, displacement pickup 23, and regulator 24, the multi-way valve 29 adjusts itself to such a position between the extreme operating positions 40 and 43 that an equilibrium of forces exists on the piston 4 and that the piston 4 remains in the position preset by the nominal value.

The equilibrium of forces on the piston 4 involves a fixed pressure difference between the small chamber 6 and the large chamber 7. This pressure difference is used for the operation of the second drive 2. However, the pressure balance 35 insures that the pressure fluid flow from the small cylinder 6 via the line 46 remains also constant when the pressure difference between the large and the small chambers changes, which may occur, for example, when the first drive is accelerated or decelerated or under an external load. To this end, provision is made that when the second drive is started, the spring side of the pressure balance 35 is connected respectively with the line 38 or 39 serving as a load pressure line. In the operating positions of the proportional action valve 32, the hydraulic fluid flows from the chamber facing away from the operating side, through the return flow line 47 back into the large chamber 7. This, however, remains without effect due to the position adjustment of the drive 1. The second drive 2 can be controlled via regulator 50 and the first drive 1 via regulator 24, the two controls being independent of each other.

Figure 2:
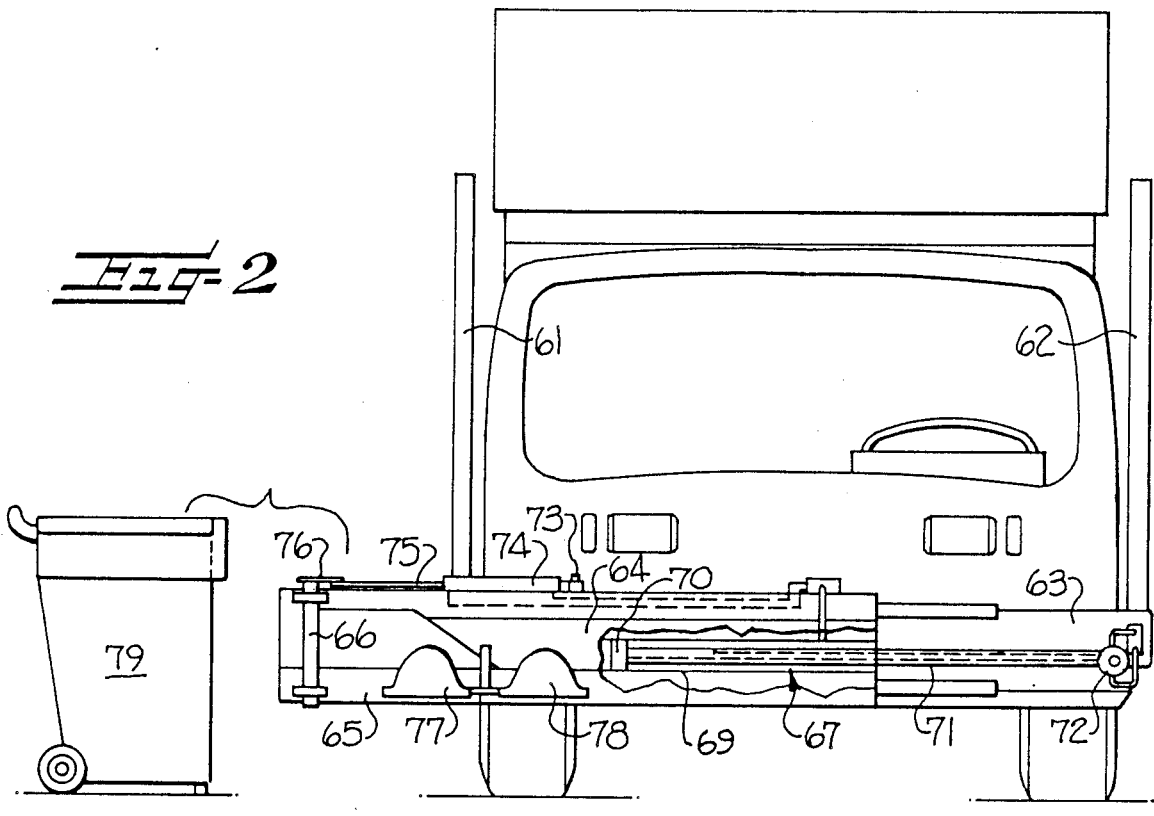
FIG. 2 is a front view of a specific embodiment of an article handling apparatus of the present invention shown mounted to a truck of the type adapted to lift and empty a garbage container.

A specific embodiment of the present invention is illustrated in FIG. 2, which is a front view of a garbage collection truck. The truck is equipped with a conventional lifting and dumping mechanism, which comprises two U-shaped pivot arms 61, 62, which are arranged on either side of the driver's cab. For a further description of the basic construction of the lifting and dumping mechanism, reference may be made to DE-OS 34 20 058, and corresponding U.S. Pat. No. 4,715,767. The free ends of the arms 61, 62 are interconnected by a rail 63 which extends horizontally across the front of the vehicle. A carrying slide 64 is transversely slideable along the rail 63 and supports a pivot arm 65 which is pivotable about a vertical axis 66. A pressure fluid-actuated piston-cylinder unit 67 moves the carrying slide 64 along the rail 63, and a piston-cylinder unit 68 pivots the arm 65 relative to the carrying slide 64.

The first pressure fluid-actuated piston-cylinder unit 67, which reciprocates the carrying slide 64 along the rail 63, comprises a cylinder 69, which is firmly connected with the carrying slide 64, and a piston rod 71, which is connected with a piston 70 at one end and with the rail 63 at the outer end 72.

Figure 3:
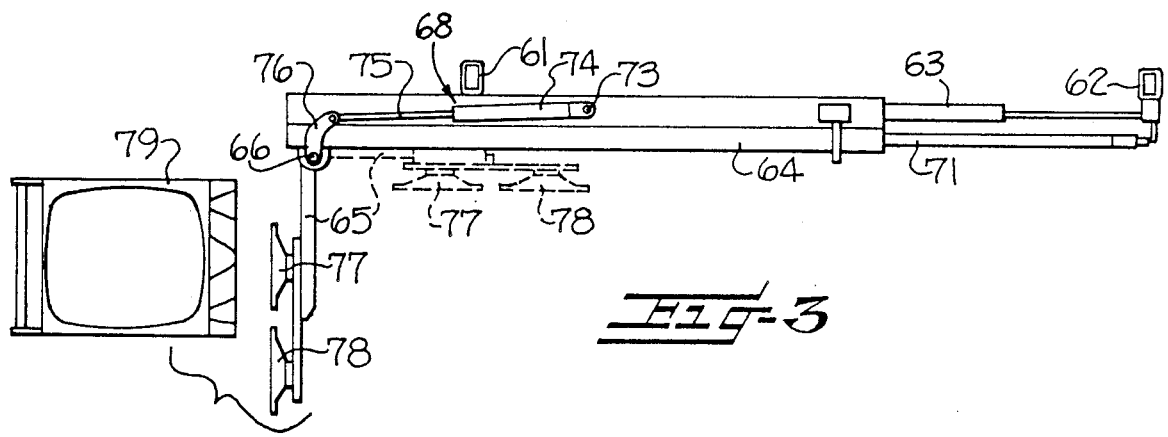
FIG. 3 is a top plan view of the article handling apparatus shown in FIG. 2.

Mounted on the carrying slide 64 and rotatable about a pin 73 is the cylinder 74 of the second pressure medium-actuated piston unit 68. The outer end of the piston rod 75 of the unit 68 is connected to a lever 76, which in turn is connected with a pivotal shaft 66, so that the pressure fluid-actuated piston-cylinder unit 68 is able to move out the pivot lever 65 carrying the two pickup claws 77, 78 and to fold it back to the carrying slide 64. Illustrated in solid lines in FIG. 3 is the pivot arm 65 in its extended position, and its retracted or folded back position is illustrated in dashed lines. In its extended position, the pivot arm 65 is able to pick up the garbage containers 79, which are held ready, by engagement with its claws 77, 78.

Figure 4:
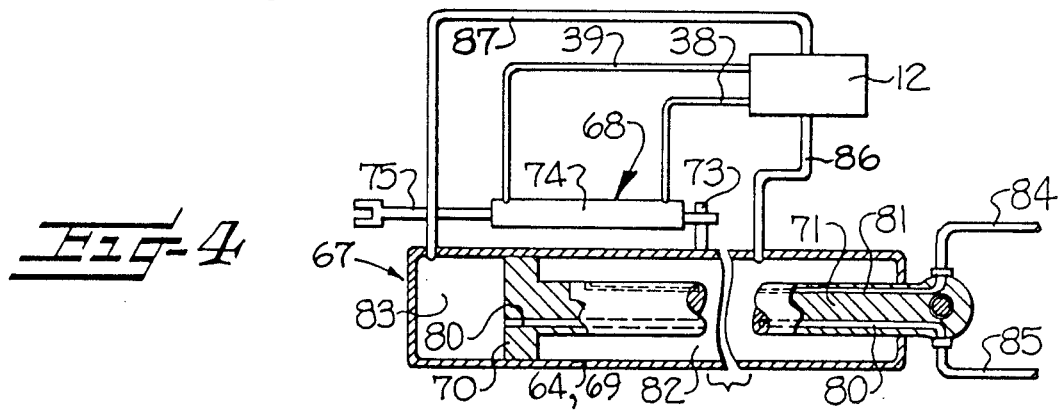
FIG. 4 is a schematic diagram of the article handling apparatus shown in FIGS. 2 and 3.

As can be seen in the schematic view of FIG. 4, the piston rod 71 of the first pressure fluid-actuated piston-cylinder unit 67 is provided with two bores 80, 81, which terminate in an annular small chamber 82 and in a large chamber 83 facing the end of the piston 70. The bores 80, 81 are connected with the pressure fluid lines 84, 85, which correspond to the pressure fluid lines 36, 37 of FIG. 1.

The chambers 82, 83 are connected, via pressure fluid lines 86, 87, with the control system 12, whence the pressure fluid lines 38, 39 lead to the second pressure fluid-actuated piston-cylinder unit 68.

Naturally, the first pressure fluid-actuated piston-cylinder unit 67 could also be installed in such a manner that the cylinder 69 is joined to the rail 63 and the piston rod 71 is firmly connected with carrying slide 64. In such an arrangement, the supply lines would preferably be arranged as described above with respect to the embodiment of FIG. 1.

In the drawings and specification, there has been set forth a preferred embodiment of the invention, and although specific terms are employed, they are used in a generic and descriptive sense only and not for purposes of limitation.

What is claimed is:

1. An article handling apparatus comprising
    a first fluid actuated drive comprising a housing and a differential piston mounted in said housing, with said housing and piston being movable relative to each other, and wherein said piston divides said housing into a small chamber and a large chamber,
    first fluid control means for selectively conveying fluid to and from each of said chambers to as to selectively move one of said housing and piston in either direction with respect to the other of said housing and piston, said first control means comprising means for sensing the position of said piston with respect to said housing, and for comparing the sensed position to a predetermined nominal value and for producing an output signal representative of any difference between the second position and the nominal value,
    a second fluid actuated drive having two fluid receiving chambers for operating said second drive in opposite directions, and
    second fluid control means for selectively connecting said small chamber of said first drive with either one of said chambers of said second drive, and while connecting the large chamber of said first drive with the other of said chambers of said second drive.

2. The article handling apparatus as defined in claim 1 wherein one of said housing and said piston is movable with respect to the other, and wherein said second drive is mounted to the movable one of said housing and piston.

3. The article handling apparatus as defined in claim 1 wherein said second fluid actuated drive comprises a second housing and a second piston mounted in said second housing, with said second housing and second piston being movable relative to each other, and wherein said second piston divides said second housing into said opposite fluid receiving chambers.

4. The article handling apparatus as defined in claim 1 wherein said housing of said first drive comprises a cylinder which is fixedly mounted, and said piston of said first drive is movable along a linear path of travel within said cylinder, and wherein said second drive and said second control means are connected to said piston.

5. The article handling apparatus as defined in claim 1 wherein said apparatus further comprises a supporting rail, and said first drive further includes a piston rod having one end connected to said piston and an opposite end fixed to said rail, and wherein said housing comprises a cylinder which is movable along a linear path of travel with respect to said rail and said piston, and wherein said second drive and said second control means are connected to said cylinder.

6. An article handling apparatus comprising
    a first hydraulic drive comprising a housing and a differential piston mounted in said housing, with said housing and piston being movable relative to each other, and wherein said piston divides said housing into a small chamber and a large chamber,
    first hydraulic control means for selectively conveying hydraulic fluid to and from each of said chamber so as to selectively move one of said housing and piston in either direction with respect to the other of said housing and piston, said first control means comprising means for sensing the position of said piston with respect to said housing, and for comparing the sensed position to a predetermined nominal value and for producing an output signal representative of any difference between the sensed position and the nominal value,
    a second hydraulic drive having the fluid receiving chambers for operating said second drive in opposite directions, and
    second hydraulic control means for selectively connecting said small chamber of said first hydraulic drive with either one of said chambers of said second hydraulic drive, and while connecting the large chamber of said first hydraulic drive with the other of said chambers of said second hydraulic drive.

7. The article handling apparatus as defined in claim 6 wherein said first control means further comprises a hydraulic pump, a tank, bypass line means for selectively diverting the flow from said hydraulic pump to said tank, and multi-way valve means responsive to said output signal for selectively operating said first hydraulic drive
    (a) in an off position (41) wherein said large chamber is connected to said tank and said small chamber is connected to said pump, and wherein said bypass line is controlled to reduce the pressure in said small chamber;
    (b) in a stationary position (42) wherein said large chamber is closed and said small chamber is connected to said pump;
    (c) in a first operative position (40) wherein said large chamber is connected to said tank and said small chamber is connected to said pump; and
    (d) in a second operative position (43) wherein said large chamber and said small chamber are each connected to said pump.

8. The article handling apparatus as defined in claim 7 wherein said bypass line means comprises a relief piston which is biased on one side by the pressure of said hydraulic pump, and which is biased on the other side by a spring and by the pressure in said small chamber in each of said stationary, first operative, and second operative positions.

9. The article handling apparatus as defined in claim 6 wherein said second hydraulic control means comprises a first connecting line (46) connected to said small chamber of said first drive, a second connecting line (47) connected to said large chamber of said first drive, a first control line (39) connected to one of said chambers of said second drive, and a second control line (38) connected to the other of said chambers of said second drive, and valve means for selectively interconnecting said lines
    (a) in an idle position wherein none of said lines are interconnected;
    (b) in a first operating position wherein said first connecting line and said first control line are interconnected, and said second connecting line and said second control line are interconnected; and
    (c) in a second operating position wherein said first connecting line and said second control line are interconnected, and said second connecting line and said first control line are interconnected.

10. The article handling apparatus as defined in claim 9 wherein said second hydraulic control means further comprises pressure balance means (35) positioned in said first connecting line and which is biased on one side by the pressure in said first connecting lien at a location downstream of said balance means and upstream of said valve means, and which is biased on the other side by a spring and by the pressure in the one of said first and second control lines which is connected to said first connecting line in each of said first and second operating positions.

11. The article handling apparatus as defined in claim 9 wherein said second hydraulic control means further comprises a regulator for operating said valve means in response to an input signal.

12. The article handling apparatus as defined in claim 6 wherein one of said housing and said piston is movable with respect to the other, and wherein said second hydraulic drive is mounted to the movable one of said housing and piston, and said second fluid actuated drive comprises a second housing and a second piston mounted in said second housing, with said second housing and second piston being movable relative to each other, and wherein said second piston divides said second housing into said opposite fluid receiving chambers.

13. An article handling apparatus adapted to be mounted to a truck of the type adapted to lift and empty a garbage container positioned along the roadway, said apparatus comprising
- a support rail (63) adapted to be fixedly mounted horizontally along the front of the truck,
- a slide (64) mounted for horizontal sliding movement along said support rail,
- a first hydraulic drive for moving said slide along said support rail and comprising a cylinder fixedly mounted to said slide, a piston mounted for sliding movement within said cylinder, and a piston rod fixedly interconnecting said piston to said support rail, and wherein said piston divides said cylinder into a small chamber and a large chamber,
- first hydraulic control means for selectively supplying hydraulic fluid to said chambers so as to selectively move said cylinder and said slide in either direction with respect to said piston,
- article pick-up means pivotally mounted to said slide for pivotal movement about a vertical axis and between a withdrawn position and an external position,
- second hydraulic drive means for pivotally moving said pick-up means between said withdrawn and extended positions, and comprising opposite fluid receiving chambers for operating said second drive in opposite directions,
- second hydraulic control means mounted to said slide for selectively connecting said small chamber of said first hydraulic drive with either one of said chambers of said second hydraulic drive, and while connecting the large chamber of said first hydraulic drive with the other of said chambers of said second hydraulic drive.

14. The article handling apparatus as defined in claim 13 wherein said first hydraulic control means comprises a first connecting line extending axially within said piston rod and communicating with said small chamber, and a second connecting line extending axially within said piston rod and communicating with said large chamber.

15. The article handling apparatus as defined in claim 14 wherein said second hydraulic drive means comprises first and second connecting lines (86, 87) communicating with said cylinder on opposite sides of said piston and at locations beyond the normal travel of said piston.

16. The article handling apparatus as defined in claim 15 wherein said second hydraulic drive means further comprises a second cylinder and a second piston mounted for movement within said second cylinder, and wherein said second piston divides said second cylinder into said opposite fluid receiving chambers, first and second control lines (38, 39) connected to respective ones of said opposite fluid receiving chambers, and valve means (12) for selectively interconnecting said connecting lines and said control lines.

17. The article handling apparatus as defined in claim 16, wherein said second cylinder is pivotally mounted to said slide, and said second hydraulic drive means further includes a second piston rod having one end fixed to said second piston and an opposite end extending outwardly from said second cylinder, and wherein said second piston and second piston rod are adapted to move along the axis of said second cylinder.

18. An article handling apparatus comprising
- a first fluid actuated drive comprising a ho using and a differential piston mounted in said housing, with said housing and piston being movable relative to each other, and wherein said piston divides said housing into a small chamber and a large chamber,
- first fluid control means for selectively conveying fluid to and from each of said chambers so as to selectively move one of said housing and piston in either direction with respect to the other of said housing and piston,
- a second fluid actuated drive having two fluid receiving chambers for operating said second drive in opposite directions,
- second fluid control means for selectively connecting said small chamber of said first drive with either one of said chambers of said second drive, and while connecting the large chamber of said first drive with the other of said chambers of said second drive,
- a supporting rail, and
- said first drive further includes a piston rod having one end connected to said piston and an opposite end fixed to said rail, and wherein said housing comprises a cylinder which is movable along a linear path of travel with respect to said rail and said piston, and wherein said second drive and said second control means are connected to said cylinder.

19. An article handling apparatus comprising
- a first hydraulic drive comprising a housing and a differential piston mounted in said housing, with said housing and piston being movable relative to each other, and wherein said piston divides said housing into a small chamber and a large chamber,
- first hydraulic control means for selectively conveying hydraulic fluid to and from each of said chambers so as to selectively move one of said housing and piston in either direction with respect to the other of said housing and piston, a second hydraulic drive having two fluid receiving chambers for operating said second drive in opposite directions, second hydraulic control means for selectively connecting said small chamber of said first hydraulic drive with either one of said chambers of said second hydraulic drive, and while connecting the large chamber of said first hydraulic drive with the other of said chambers of said second hydraulic drive, and said second hydraulic control means comprises a first connecting line (46) connected to said small chamber of said first drive, a second connecting line (47) connected to said large chamber of said first drive, a first control line (39) connected to one of said chambers of said second drive, and a second control line (38) connected to the other of said chambers of said second drive, and valve means for selectively interconnecting said lines (a) in an idle position wherein none of said lines are interconnected;

(b) in a first operating position wherein said first connecting line and said first control line are interconnected, and said second connecting line and said second control line are interconnected; and (c) in a second operating position wherein said first connecting line and said second control line are interconnected, and said second connecting line and said first control line are interconnected, and pressure balance means (35) positioned in said first connecting line and which is biased on one side by the pressure in said first connecting line at a location downstream of said balance means and upstream of said valve means, and which is biased on the other side by a spring and by the pressure in the one of said first and second control lines which is connected to said first connecting line in each of said first and second operating positions.

20. An article handling apparatus comprising first fluid actuated drive comprising a housing and a differential piston mounted in said housing, with said housing and piston being movable relative to each other, and wherein said piston divides said housing into a small chamber and a large chamber, first fluid control means for selectively conveying fluid to and from each of said chambers so as to selectively move one of said housing and piston in either direction with respect to the other of said housing and piston, a second fluid actuated drive having two fluid receiving chambers for operating said second drive in opposite directions, and second fluid control means for selectively connecting said small chamber of said first drive with either one of said chambers of said second drive, and while connecting the large chamber of said first drive with the other of said chambers of said second drive, said second fluid control means comprising a first connecting line (46) connected to said small chamber of said first drive, a second connecting line (47) connected to said large chamber of said first drive, a first control line (39) connected to one of said chambers of said second drive, and a second control line (38) connected to the other of said chambers of said second drive, valve means (32) for selectively interconnecting said lines in a first operating position wherein said first connecting line and said first control line interconnected and said second connecting line and said second control line are interconnected, and in a second operating position wherein said first connecting line and said second control line are interconnected and said second connecting line and said first control line are interconnected, and pressure balance means (35) positioned in said first connecting line and which is biased on one side by the pressure in said first connecting line at a location downstream of said balance means and upstream of said valve means, and which is biased on the other side by a spring and by the pressure in the one of said first and second control lines which is connected to said first connecting line in each of said first and second operating positions.

21. The article handling apparatus as defined in claim 20 wherein said valve means further includes means for selectively interconnecting said lines in an idle position wherein none of said lines are interconnected.

* * * * *